June 10, 1941.  E. M. UNDERWOOD  2,244,815
REVOLVING CONE MIXER
Original Filed Aug. 3, 1937
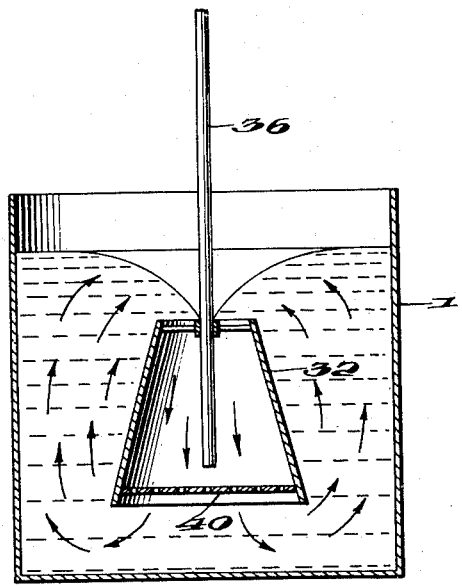
Inventor
Elvin M. Underwood
By Vernon E. Hodges
H. Hamlin Hodges
his Attorneys Patented June 10, 1941

2,244,815

UNITED STATES PATENT OFFICE 2,244,815

REVOLVING CONE MIXER

Elvin M. Underwood, East Liverpool, Ohio, assignor to The Patterson Foundry & Machine Co., East Liverpool, Ohio, a corporation of Ohio Original application August 3, 1937, Serial No. 157,191. Divided and this application March 25, 1939, Serial No. 264,223

1 Claim. (Cl. 259—96)

This invention relates to an improvement in revolving cone mixers, and is a division of my application Serial No. 157,191, filed in the United States Patent Office, August 3, 1937.

The invention consists in a cone rotatably supported in a tank which is adapted to contain the material to be mixed, and which cone is open at its smaller end, and partially closed at its larger end, whereby to form a basket-type of arrangement in which material may be held while circulation of liquid takes place through it.

The drawing is a sectional view through tank and cone.

The cone 32 is preferably truncated, and substantially open at its smaller end where it is attached to the rotatable shaft 36 mounted in the tank 1. The sides of this cone are preferably closed. A perforated plate 40 closes the larger end of the cone.

Thus constructed, the cone not only finely divides the material passing therethrough as it circulates in and around the cone, in continuous action, but also it is intended to be utilized as a basket or receptacle in which material can be held while circulation takes place through it.

The arrows indicate the general circulatory action which takes place within the tank, due to the rotation of the cone therein, the current passing from the smaller end of the cone through the cone and out through the reticulated plate 40, and thence toward the bottom of the tank, upwardly therefrom between the sides of the cone and the wall of the tank, and back through the smaller end of the cone in a continuous movement as long as the cone is rotated.

I claim:

A mechanism of the class described including a tank, a rotatably supported shaft extending vertically into said tank, a truncated imperforate cone secured to said shaft within the tank with its smaller end uppermost and open, and reticulated means covering its larger end.

ELVIN M. UNDERWOOD.